United States Patent [19]

Kuwamoto et al.

[11] Patent Number: 5,483,632
[45] Date of Patent: Jan. 9, 1996

[54] METHOD AND SYSTEM OF HELP-INFORMATION CONTROL

[75] Inventors: Hideki Kuwamoto; Tadashi Kuwabara; Hiroyuki Koreeda; Naomichi Nonaka; Keiichi Nakane, all of Yokohama; Masaki Fujiwara, Hitachi; Kiyoshi Masuda, Oomiya, all of Japan

[73] Assignee: Hitachi, Ltd., Tokyo, Japan

[21] Appl. No.: 375,663

[22] Filed: Jan. 20, 1995

Related U.S. Application Data

[63] Continuation of Ser. No. 987,569, Dec. 8, 1992, Pat. No. 5,434,963, which is a continuation of Ser. No. 398,513, Aug. 25, 1989, abandoned.

[30] Foreign Application Priority Data

Sep. 3, 1988 [JP] Japan .................................. 63-221059
Sep. 14, 1988 [JP] Japan .................................. 63-228636
Sep. 14, 1988 [JP] Japan .................................. 63-228638

[51] Int. Cl.$^6$ ..................................................... G06F 17/30
[52] U.S. Cl. ........................... 395/156; 395/155; 395/161; 395/600; 395/700; 395/157
[58] Field of Search ....................................... 395/144–146, 395/153, 154, 155–161, 275, 600, 650, 700, 934; 364/188, DIG. 1, DIG. 2, 419.1, 419.13

[56] References Cited

U.S. PATENT DOCUMENTS

| | | | |
|---|---|---|---|
| 4,754,326 | 6/1988 | Kram et al. | 364/DIG. 2 |
| 4,782,463 | 11/1988 | Sanders et al. | 395/700 |
| 4,821,211 | 4/1989 | Torres | 395/156 |
| 4,951,190 | 8/1990 | Lane et al. | 364/188 X |
| 4,964,077 | 10/1990 | Eisen et al. | 364/DIG. 2 |
| 5,335,323 | 8/1994 | Kolnick | 395/157 X |

*Primary Examiner*—Almis R. Jankus
*Attorney, Agent, or Firm*—Antonelli, Terry, Stout & Kraus

[57] ABSTRACT

A method of help-information control for displaying help information on a display unit of an information processing system executing a plurality of application programs. A status management table for storing the executing status of application programs is provided as common to these programs. During execution of a given application program, the contents of the status information table are updated successively in accordance with the executing status. Whenever an operator makes a help request, the contents of the status management table in effect at that point in time are referenced. The table is searched for the help information corresponding to the request. When found and retrieved, the information is displayed. The search is performed using a program identifier, a message identifier, and a help message searching table that includes the position information containing the corresponding help data. Each application program is equipped with a control data part that makes it possible to reference help data of other application programs.

16 Claims, 12 Drawing Sheets

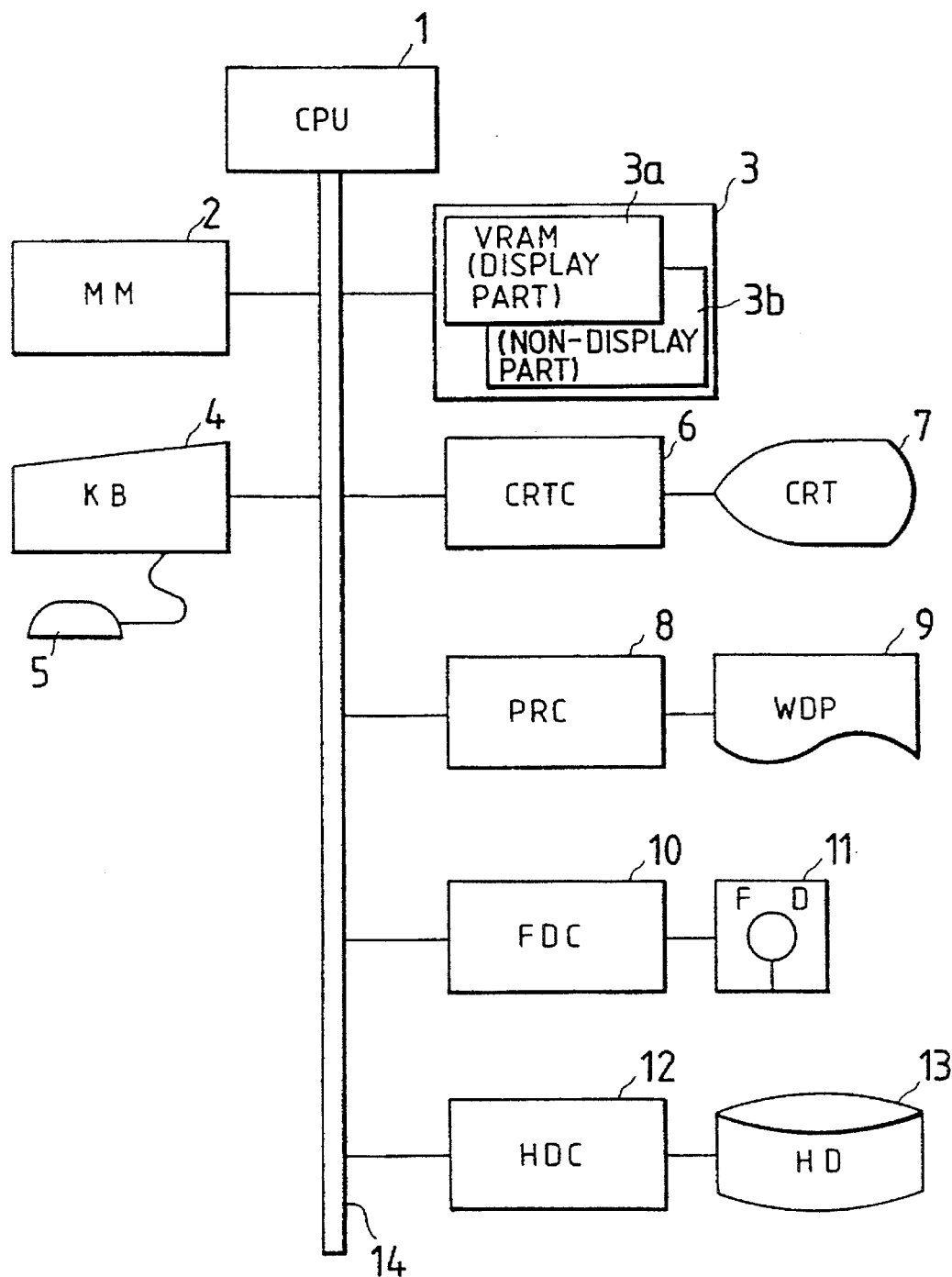

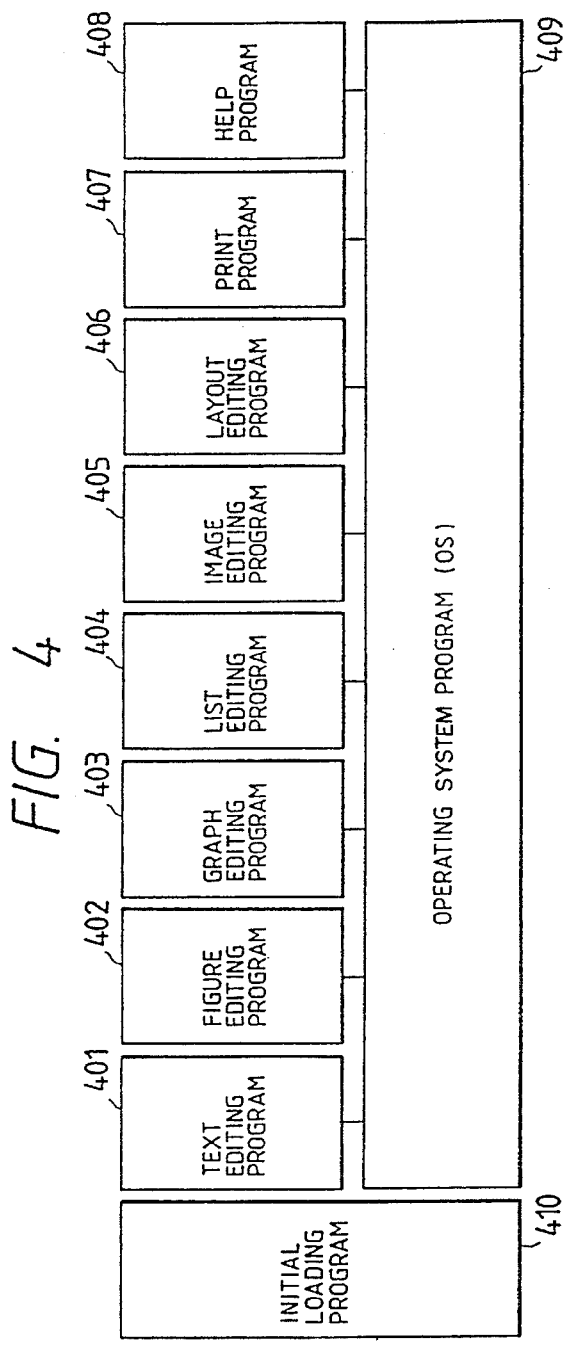

FIG. 6
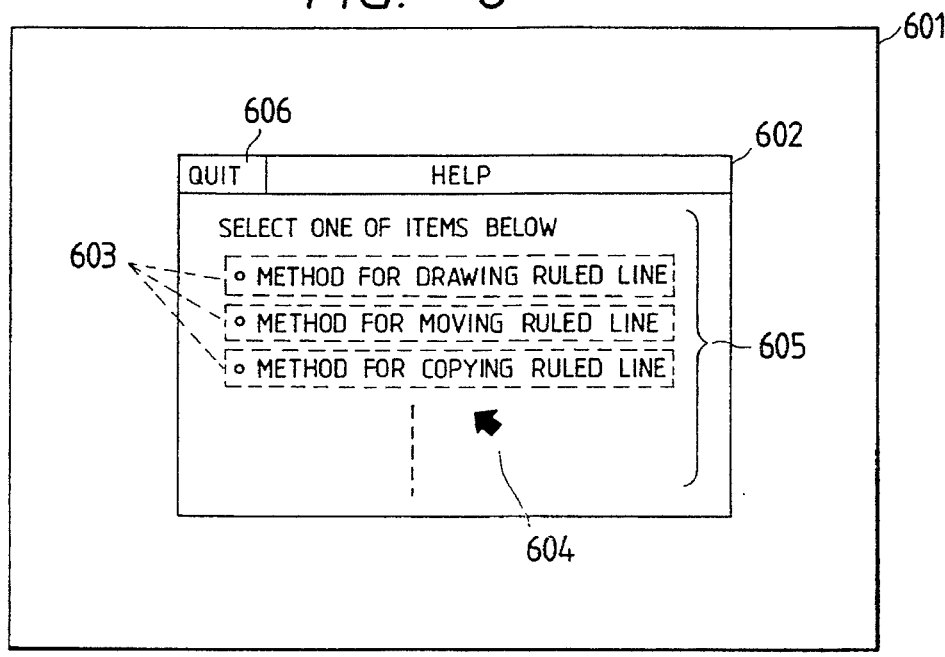
FIG. 7
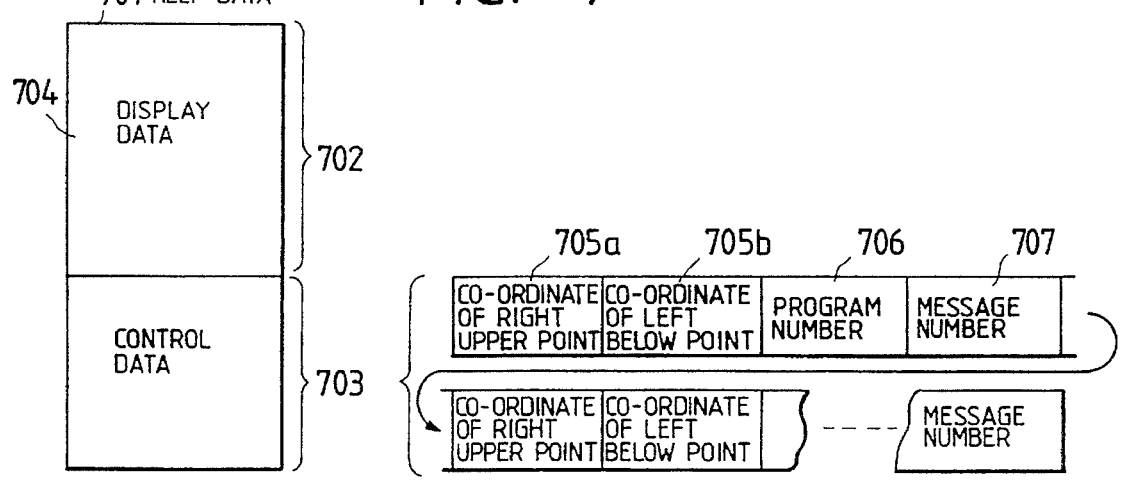
FIG. 8
HELP DATA MANAGEMENT TABLE

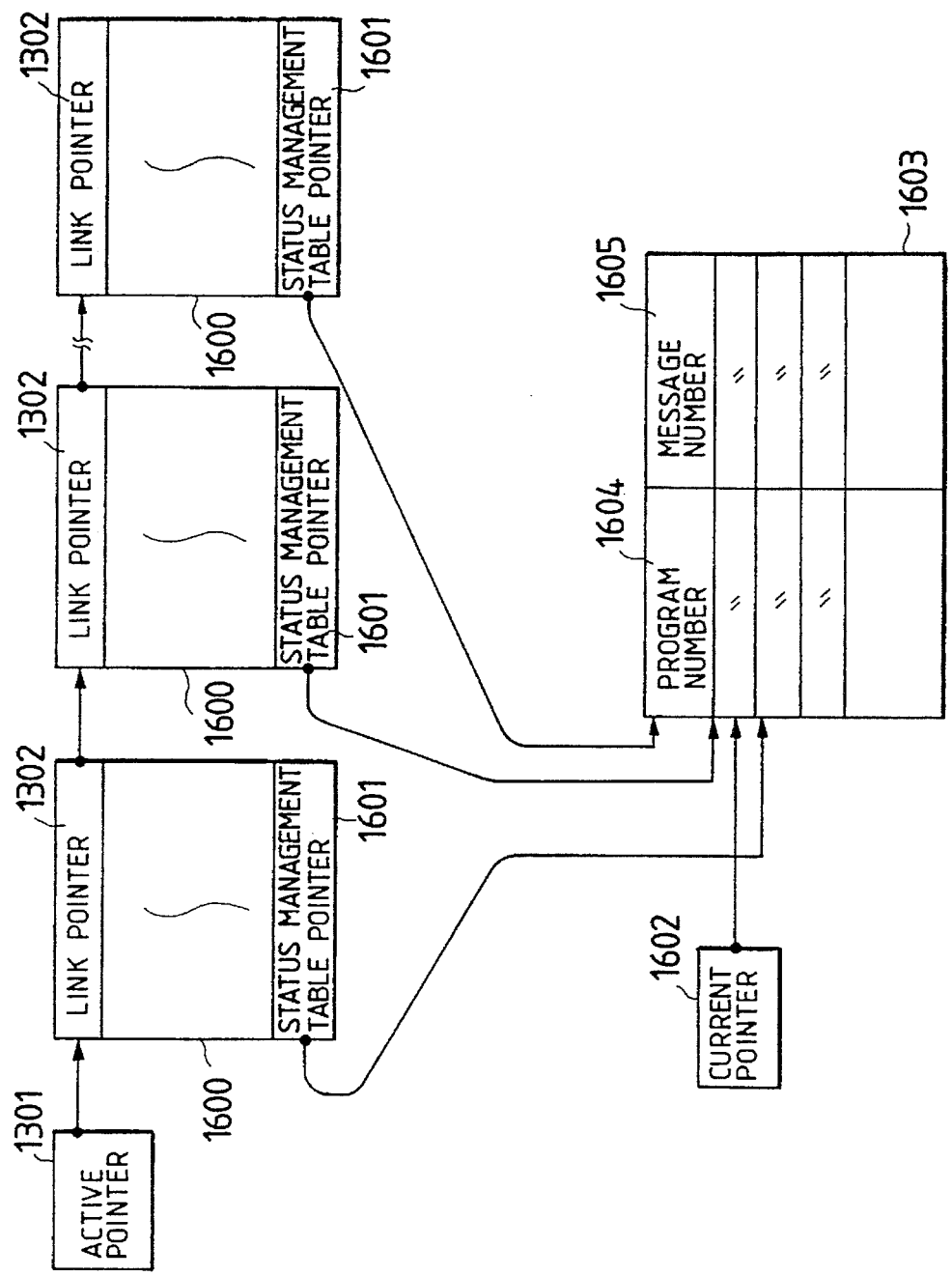

METHOD AND SYSTEM OF HELP-INFORMATION CONTROL

This is a continuation of application Ser. No. 07/987,569, filed Dec. 8, 1992, now U.S. Pat. No. 5,434,963, which is a continuation of applications Ser. No. 07/398,513, filed Aug. 25, 1989, now abandoned.

BACKGROUND OF THE INVENTION

The present invention relates to a method and a system having a help Facility for use in processing information and, more particularly, to a method and a system adapted to control help information in implementing the help facility for use with integrated software comprising a plurality of application programs.

A majority of today's information processing systems are equipped with what is known as a help facility. Using that facility, an operator of such a system, when at a loss as to how to handle it, may be given pertinent instructions for proceeding with the ongoing process.

An example of conventional help facilities for use with information processing systems is found in Laid-open Patent No. 62-179016. in this example, when an operator is not sure how to operate the information processing system he is using, he may hit a specific key on the keyboard attached. The keystroke causes a display unit of the system to indicate what is called help information, i.e., a body of information about the correct operating procedures corresponding to the immediately preceding message that was output by the ongoing program of the system.

The above-described example also includes means for providing integrated software comprising at least two application programs with an independent help facility corresponding to each of these programs.

The conventional techniques referred to above involves the following problem. The help information available to the operator at a given point in time is only that corresponding to the immediately preceding message. That is, if a help request is made at a certain point in time, it is impossible to provide help information reflecting more detailed status of the application programs involved.

The fact that integrated software comprised of at least two application programs has help facilities for each of the application programs inevitably complicates the functions of these programs. Furthermore, the means for implementing such help facilities overlap in varying degrees between application programs. This results in a bloated size of the integrated software as a whole.

In addition, an independent help facility for each of the application program's constituting integrated software makes it impossible to reference help information keyed to any application program other than the currently executing one.

It is thus apparent that the problem with conventional methods for implementing help facility for application programs is threefold: (1) these methods tend to complicate the mechanism of the help facility; (2) the total size of integrated software must be increased; and (3) it is impossible to reference help information across different application programs.

SUMMARY OF THE INVENTION

It is an object of the invention to provide a method and a system of help-information control whereby each of the application programs forming integrated software has its current status stored so that pertinent help information reflecting that status is given in response to a help request from an operator.

It is another object of the invention to provide a method and a system of help-information control whereby integrated software comprising multiple application programs has its help facility simplified so that any increase in the total size of the software resulting from addition of such facility is minimized, with the help information that corresponds to an application program other than the currently executing one being referenced whenever the help facility is activated.

It is a further object, of the invention to provide a method and a system of help-information control whereby the help facility, in displaying a help screen always in the foreground active window of a multi-window system, is implemented so that the processing overhead on application programs is minimized, with the contents of help messages for display being readily modified in accordance with any changes in or additions to application program functions.

In order to accomplish the objects described above, the present invention envisages, among others, provision of a status management table in memory. During execution of a given application program, this table has its contents successively updated to reflect the executing status. When an operator makes a help request at a given point in time, the current contents of the status management table are referenced. Then the help information corresponding to the contents of the status management table are searched for and output accordingly.

The method of help-information control according to the present invention has a system program that provides unified control over help information on multiple application programs. While an application program is executing, the other application programs notify the system program of their executing status. When the operator makes a help request, the system program interrupts the execution of the current application program to activate a help program. The help program references the executing status retained by the system program in order to look for pertinent help data and output relevant help information.

The method of help-information control according to the present invention makes it possible to include the help information on at least one application program into the help information on another application program that is output to reflect its executing status at a given point in time.

The status management table according to the present invention stores pairs of a program identifier and a message identifier, the two being related to each other. The program identifier identifies each application program. The message identifier, also known as a status code, indicates the executing status of each application program.

According to the present invention, there is also provided a help-information searching table for searching for relevant help information. This table stores a program identifier corresponding to each application program. Also stored in the table is a message identifier indicating the executing status of each application program. In addition, the table contains a storing position of help message data corresponding to the message identifier above. The two kinds of identifier and each storing position are appropriately related to one another when stored.

Help data, or help message data are divided into a display data part and a control data part in memory. The display data part stores data for displaying help information on a display unit. The control data part stores three items: (1) the on-screen position where given display data is displayed on the display unit; (2) a program identifier for specifying the help data or help message data required by the display data; and (3) a message identifier as a status code. The three items are related to one another in storage. The program identifier in the control data part may point to the application program that has called the current display data; the program identifier may also point to another application program. This makes it possible to interchange help data for use between multiple application programs.

According to the present invention, there are also provided a help data management table and a help message searching table. The help data management table contains a program identifier that identifies each application program and a storing position where the help data for each application program is stored. The program identifier and the storing position are related to each other when stored. The help message searching table contains a message identifier for each help message of application programs, along with a storing position where each help message of help data is stored. The message identifier and the storing position are also related to each other when stored. In searching for help message data, the two tables are used to find out where the desired help message data is located in memory. On completion of the search, the data is displayed on the display unit. The two tables have the same functions as those of the above-described help-information searching table.

When application programs are incorporated into an information processing system, the storing position of the help data for each application program is stored in the help data management table.

In addition, according to the present invention, there are provided window management blocks for managing the information about each of multiple windows displayed on the screen of a multi-window system. The blocks are connected into a list structure in the order in which a pointer of active window pointing to the window management block for the foreground active window is followed successively by subsequent windows. Each window management block has a field accommodating a program identifier that identifies the application program using the corresponding window, and another field accommodating a message identifier that identifies the help message keyed to the application program using that window. When a window is opened, this arrangement generates a new window management block for the opened window. The newly generated block is placed at the beginning of a window management block list. At this time, initialization causes the program identifier of the application program that opened the window to be set to the program identifier field of the generated window management block. Meanwhile, a predetermined initial value is set to the help message identifier field of the block. The application program that opened the window may require modifying a help message that reflects its executing status. In such a case, the application program sets the necessary message identifier to the help message identifier field of the corresponding window control block.

Furthermore, according to the present invention, there are provided window management blocks for managing the information about each of multiple windows displayed on the screen of a multi-window system adapted for help information control. Each window management block may include a status table pointer that points, in the above-described status management table, to the program identifier and message identifier of the application program that uses the corresponding window.

In a multi-window system, the help window becomes the foreground active window on which to display the help data searched for.

The description above has focused on the method of help-information control according to the present invention. The system of help-information control in accordance with the present invention will become apparent from the description that follows of the preferred embodiments according to the invention.

BRIEF DESCRIPTION OF THE DRAWINGS

FIG. 3 is a block diagram showing the hardware configuration of an information processing system such as a wordprocessor to which the present invention is applied;

FIG. 4 is a schematic diagram showing a typical software configuration according to the present invention;

FIG. 5 illustrates the structure of a help message searching table in the first embodiment of the present invention;

FIG. 6 depicts the structure of a help window to be displayed on a display unit by activation of the help facility according to the present invention;

FIG. 7 shows the structure of help data that occurs in the first embodiment of the present invention;

FIG. 8 illustrates the structure of a help data management table in a second embodiment of the present invention;

Figure 1:
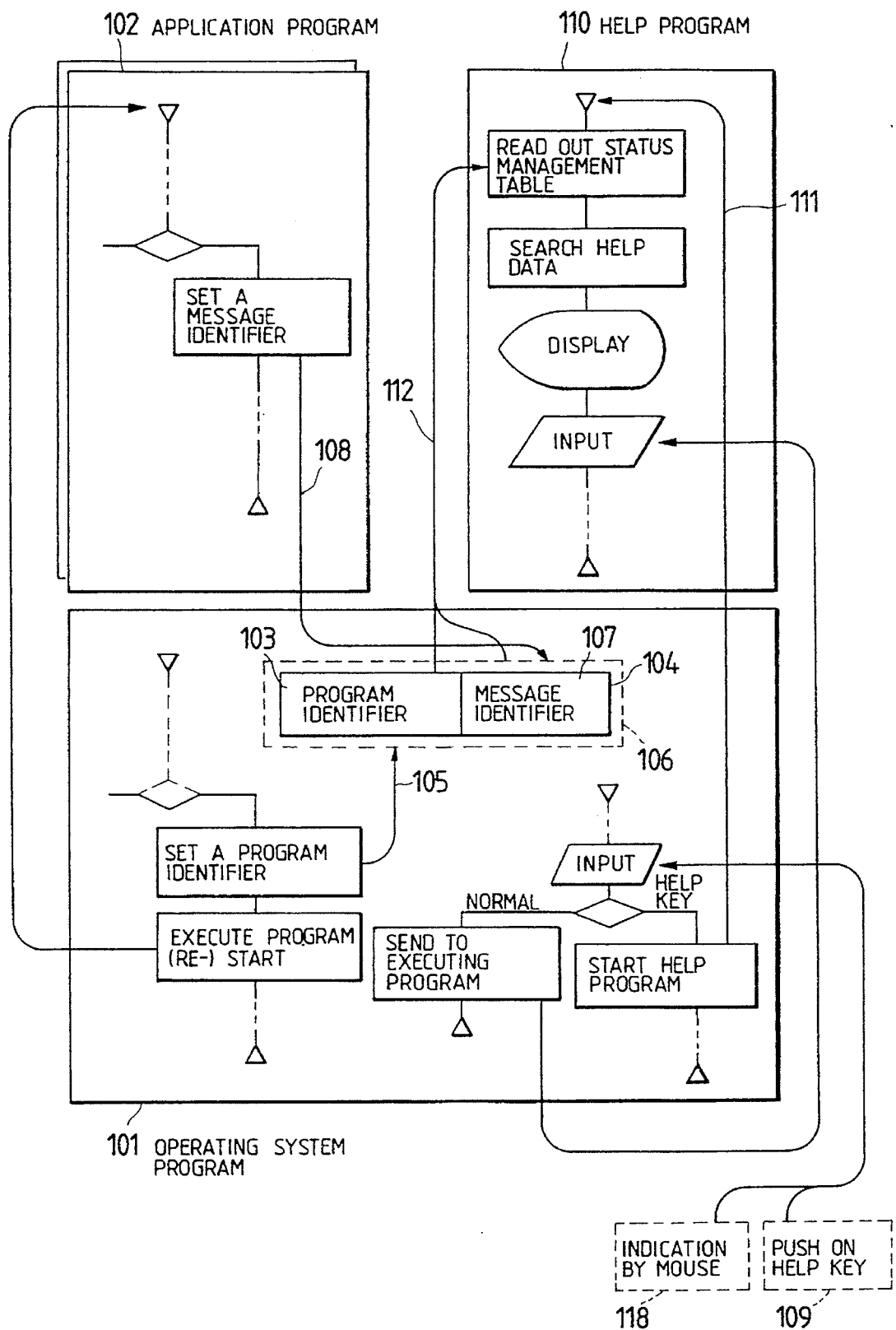
FIG. 1 is a diagram for explaining the features of a help facility in a first embodiment of the present invention.

DETAILED DESCRIPTION OF THE PREFERRED EMBODIMENTS:

The preferred embodiments of the present invention will now be described referring to the drawings. These embodiments are particularly suitable for a wordprocessor.

FIG. 3 is a block diagram showing the hardware configuration of a word-processor, which is an embodiment of the present invention. In the figure, reference numeral 1 is a central processing unit (hereinafter called the CPU). The CPU executes document-editing programs and controls peripheral equipment. Numeral 2 is a main memory (hereinafter called the MM) wherein are stored the document-editing programs and their associated data. The programs to be executed by the CPU 1 include resident and non-resident programs. The resident programs always stay in the MM 2. The non-resident programs are usually stored in a hard disk drive (hereinafter called the HD) 13 and are rolled into the MM 2 or rolled out of it and back to the HD 13 as needed. Numeral 3 is a video random access memory (hereinafter called the VRAM). The contents of the VRAM 3 comprise a display part 3a and a non-display part 3b. The display part 3a is displayed on a cathode ray tube (hereinafter called the CRT) 7. The non-display part 3b provides a temporary save area that accommodates data to be displayed on the CRT 7.

Instructions for document editing, printing, and activation of the help facility, as well as operations for document input are entered through a keyboard (hereinafter called the KB) 4 and a mouse 5. Numeral 6 is a cathode ray tube controller (hereinafter called the CRTC). The CRTC 6 controls the CRT 7 that provides a screen on which to edit documents. The CRT 7 displays the contents of the display area 3a of the VRAM 3. Numeral 8 is a printer controller (hereinafter called the PRC). The PRC 8 controls a wire-dot printer (hereinafter called the WDP) 6 on which documents and the like are output. Numeral 10 is a floppy disk controller (hereinafter called the FDC). The FDC 10 controls a floppy disk drive (hereinafter called the FD) 11 whereby document data is written to and read from floppy disks. Numeral 12 is a hard disk controller (hereinafter called the HDC). The HDC 12 controls a hard disk drive (hereinafter called the HD) 13 whereby document-editing programs, document data, and help data are written to and read from hard disks. Numeral 14 is a bus over which data is exchanged between the CPU 1 and the peripherals 2 through 13.

FIG. 4 illustrates the configuration of the software for use with the word-processor of this embodiment. In this figure, reference numerals 401 through 408 are application programs (hereinafter called APs) for editing documents. Numeral 401 stands for a text editing program, 402 for a figure editing program, 403 for a graph editing program, 404 for a list editing program, and 405 for an image editing program. Numeral 406 is a layout editing program that integrates into a single document those documents edited by the foregoing APs. Numeral 407 is a print program for printing documents. Numeral 408 is a help program that implements the help facility. Programs 401 through 408 are each controlled as an independent task by an operating system program (hereinafter called the OS) 409. The OS 409 provides a wide range of controls: from basic task control to input/output control to multi-window control on the CRT screen. APs and the OS 409 are loaded by an initial loading program 410 for initialization.

FIG. 5 depicts the structure of a help message searching table 501 for use wit the word-processor of this embodiment. The help message searching table 501 is used to search fox a position 501 on the HD 13 in which exists help data containing the help information on the type and status of each AP. The type of a specific AP is uniquely identified by a program identifier 502, and the status of the same AP by a message identifier 503. Every time an AP is loaded into the word-processor, the storing position of the help data keyed to that AP is automatically set to the help message data searching table 501.

FIG. 6 shows the structure of a help window arrangement that is displayed on a screen 601 of the CRT 7 by activation of the help facility of this embodiment. Numeral 602 is a help window for displaying help information for the benefit of a user. More specifically, display data 605 is displayed as help data. Numeral 603 is a set of rectangular areas defined by control elements in the help data. More about this arrangement will be described in reference to FIG. 7.

Numeral 604 is a mouse cursor to be operated using the mouse 5. Numeral 606 is a click-box for quitting. The click-box 606 is clicked with the mouse 5 to quit the help facility.

FIG. 7 depicts the help data structure for use in this embodiment. Help data 701 comprises a display data part 702 and a control data part 703. The display data part 702 includes text data 704 to be displayed as help information. The control data part 703 comprises coordinates of upper right point 705a, coordinates of lower left point 705b, a program identifier 706 and a message identifier 707. These coordinates represent those points on the screen that are used to move the mouse cursor 604 into the rectangular areas 603 within the help window and to click the mouse 5 where desired, thereby selecting other help data for new display. The program and message identifiers are used to define the target help data. When the user references the help data 605 displayed inside the help window 602 and points to a character string within the rectangular area 603 defined by the control data 703, a contrivance is implemented whereby other help data may be referenced across different APs.

Figure 2:
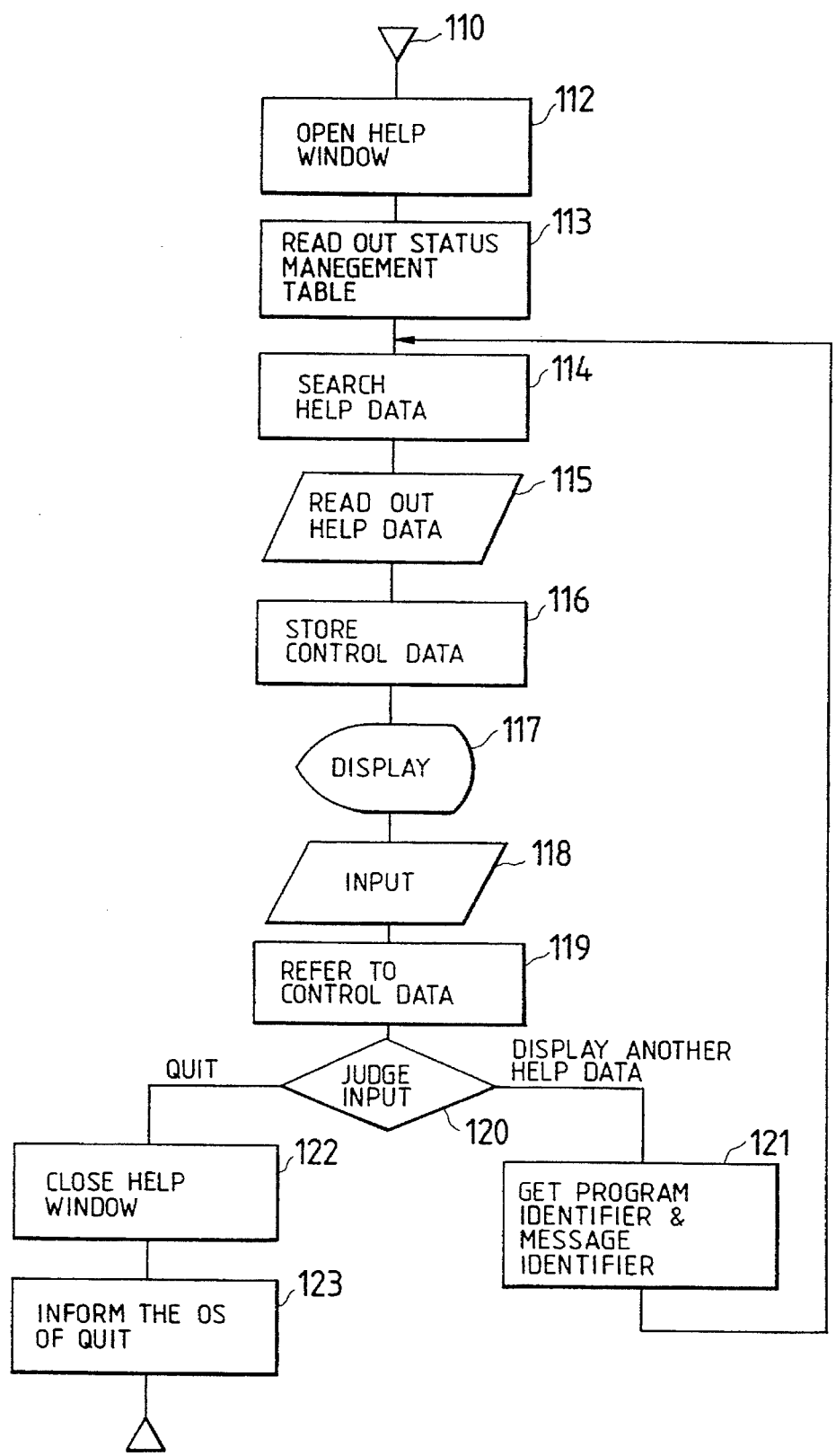
FIG. 2 is a flowchart of a help program that functions in the first embodiment of the present invention.

Referring now to FIGS. 1 and 2, there will now be explained ways to implement time help facility for use with the word-processor whose system configuration has been described in the foregoing embodiment FIG. 1 is a view for explaining how the help facility works in this embodiment. FIG. 2 is a flowchart showing how the help program operates.

Referring to FIG. 1, the process leading up to activation of a help program 110 is explained. An OS 101 that corresponds to the foregoing OS 409 places a program identifier 103 of an AP 103 in a status management table 104 when APs 102 representing the above-described APs 401–408 are activated. Numeral 105 denotes this step. The status management table 104 resides in a common memory area 106 of the MM 2. It is always possible for the APs 102 and the OS 101 to write and read data to and from the common memory area 106. At a predetermined point in time, each AP 102 enters a message identifier 107 into the status management table 104. For example, at a fixed point in time, a text editing program 102 places in the status management table 10, the message identifier 107 indicating that the program is executing its character string copy Function. Numeral 108 denotes this step. When the display screen is changed, each AP 102 similarly finds out its own status, and generates a suitable message identifier and places it in the table 104 as needed. In this manner, the program identifier 103 and message identifier 107 of the currently running AP are always found in the status management table 104.

When a help key is pushed in step 109, the OS 101 interrupts the ongoing AP 102 and activates a help program 110, in step 111. It should be noted that when the help program 111 is activated, the contents of the status management table 104 are retained the same as before help program activation.

Referring to FIG. 2, the execution of the help program 110 is explained. When activated, the help program 110 opens a help window 602, in step 112, for displaying the help data explained with reference to FIG. 6. The program identifier 103 and message identifier 107 of the AP in effect immediately before help program activation are read from the status management table 104, in step 113. By using the help message searching table 501 in FIG. 5, a search starts, in step 114, for the storing position of help data 701 in the HD 13, in FIG. 7, that corresponds to the program identifier 103 and message identifier 107 read from the status management table 104. The help data 701 is read in step 115, with its associated control data 703 stored in step 116. Display data 702 is displayed within the help window 602 in step 117. While the help data is being displayed, the inside of the help window 602 may be pointed to by the mouse cursor 604 in step 118. At this time, the coordinates 705 of the control data 703 stored in step 116 are referenced in step 119. The indicated position is then judged in step 120. If the inside of the rectangular area 603 defined by the control data 703 is pointed to and selected, the program identifier 706 and message identifier 707 corresponding to the rectangular area 603 are acquired in step 121. The help data corresponding to the program identifier 706 and message identifier 707 is searched for again, in step 114, using the help message searching table 501. When found, the help data is displayed inside the help window 602 in step 117.

If the click-box for quitting 606 is pointed to and selected using the mouse cursor 604, the help program 110 closes the help widow 602 in step 122, and asks the OS 101 to terminate its execution in step 123. The OS 101 ends the help program 110 accordingly, and resumes the execution of the AP 102 that was interrupted.

As a summary of this embodiment, the status management table 104 is provided in the common memory area 106 to and from which the APs 102 and the OP 101 can always write and read data. Upon activation of a specific AP 102, the program identifier 103 indicating the type of AP is placed in the status management table 104. The message identifier 107 indicating the executing status of that AP is placed as needed in the status management table 104. Pushing the help key activates the help program. The activated help program implements the help facility by displaying the help data that corresponds to the program identifier 103 and message identifier 107 stored in the status management table 104. This arrangement allows each AP 102 to enter its executing status, at any point time, into the status management table 104. Whenever the help facility is requested, help information reflecting detailed status of the applicable AP 102 is made available. Because the workings of the help facility for each AP 102 are simplified, it is possible to minimize any increase that may occur in the total size of wordprocessing software as a result of adding the help facility to the word-processor. The addition of the control data 703 to the help data. 701 allows the user to reference the help data 605 shown inside the help window 602. By specifying the interior of the rectangular area 603 defined by the control data 703, the user may reference other help data across different APs.

A second preferred embodiment of the present invention will now be described referring to the drawings. The storing position of help data in the HD 13 is first searched for using the help message searching table 501 after the help window is opened as described with reference to the first embodiment. What characterizes the second embodiment here is the use of a help data management table during the search for the help data. The help data management table is a table that specifies the storing position of the help data in the HD 13 for a given AP with reference to the program identifier representing the type of that AP. The table is provided in a predetermined memory position in the HD 13. In the second embodiment, help data means a set of help message data.

FIG. 8 shows how a typical help data management table is structured. In this example, the storing positions 803 of help data for the APs 401 through 407 in FIG. 4, placed in offset relation to the beginning of the table, correspond to the program identifier 802 indicating the type of each AP.

Figure 9A:
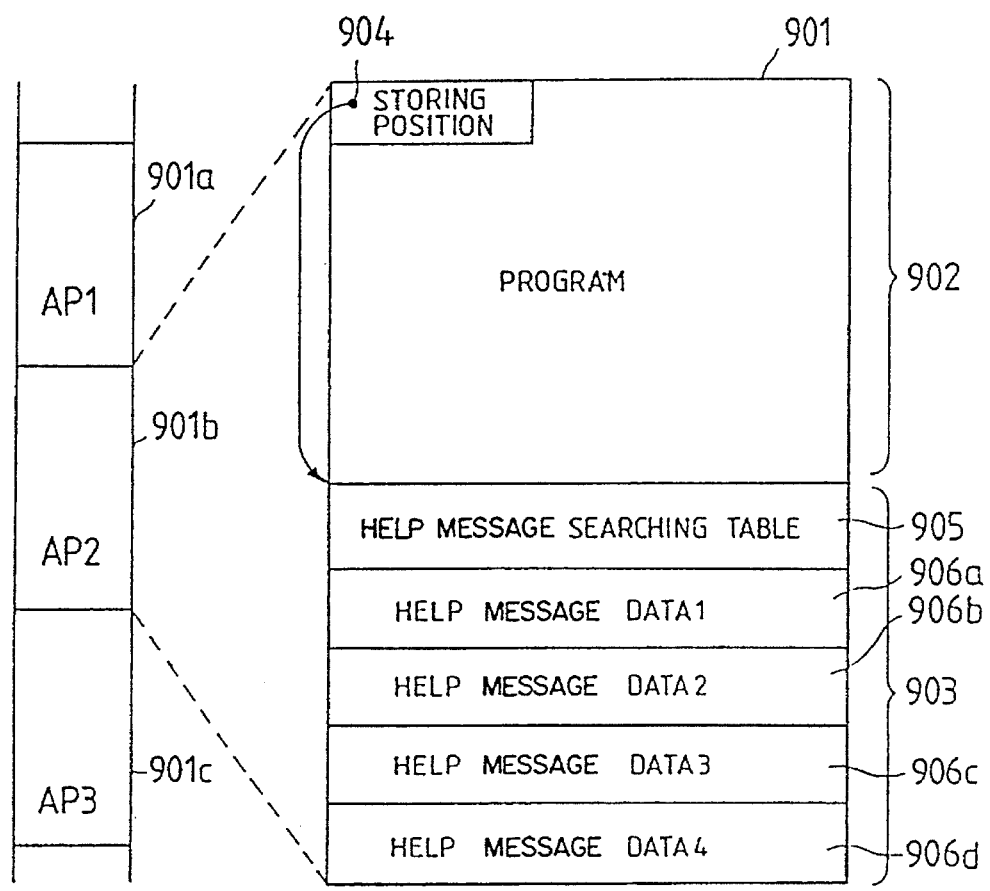
FIGS. 9A and 9B depict, respectively, a typical application program structure and a typical help message searching table structure, both for use in the second embodiment of the present invention.

FIG. 9A illustrates a typical AP configuration for the second embodiment. Each AP 901 comprises a program part 902 and a help data part 903. One help data section of the part 903 exists for and resides in each AP 901. At the beginning 904 of a give AP 901 are described the storing positions of divisions of the help data part 903 in the order in which these divisions are located in offset relation to the beginning of that AP 901. The help data part 903 includes one help message searching table 905 and at least one set of help message data 906. The help message searching table is located at the beginning of the help data part 903.

Figure 9B:
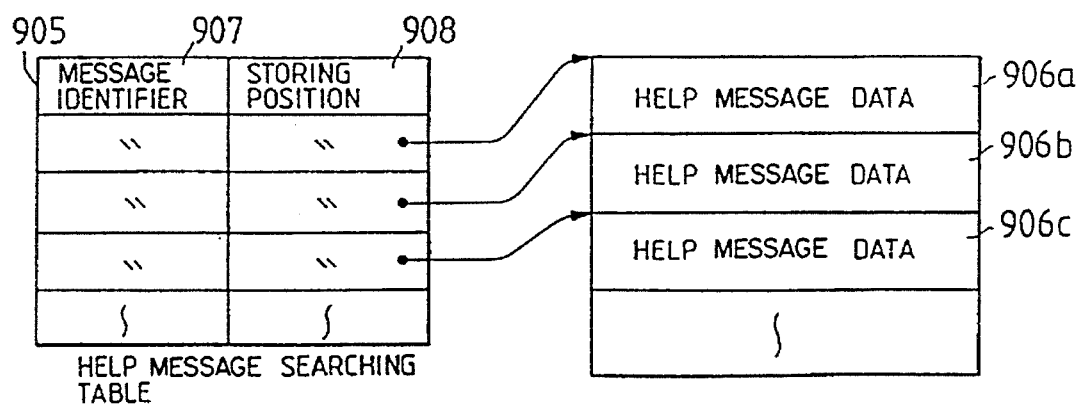

FIG. 9B depicts the structure Of the help message searching table 905 for the second embodiment. This table is used to search for a storing position 908 of help message data 906 corresponding to a specific message identifier 907. The storing position 908 of help message data is given in offset relation to the beginning of the help data part 903 in FIG. 9A. The structure of the help window and that of the help message data will not be explained here because these structures are the same as those of the first embodiment. FIGS. 6 and 7 may be referred to for the description of these structures.

Figure 10:
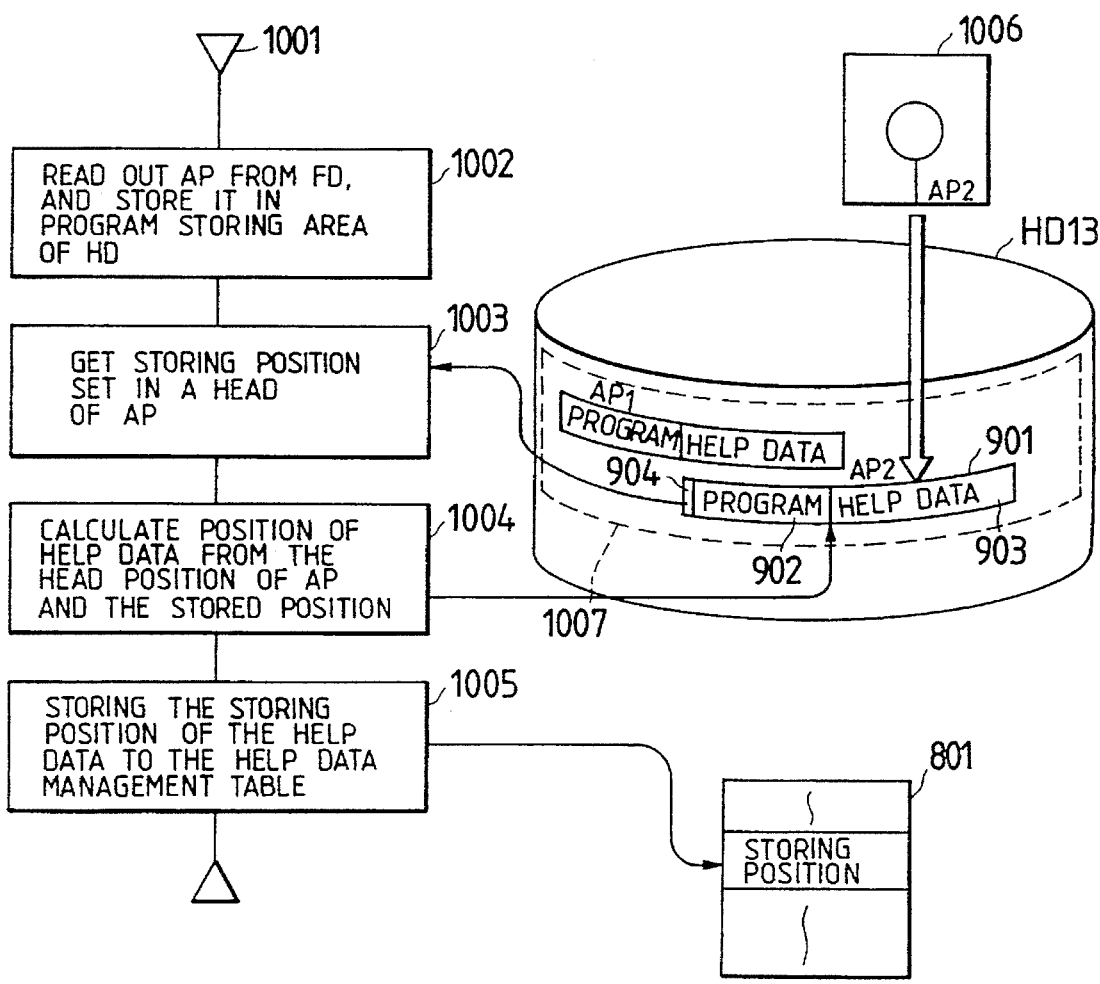
FIG. 10 is a view for explaining the process whereby a help data storing position is stored in the help data management table in the second embodiment of the present invention.
Figure 11:
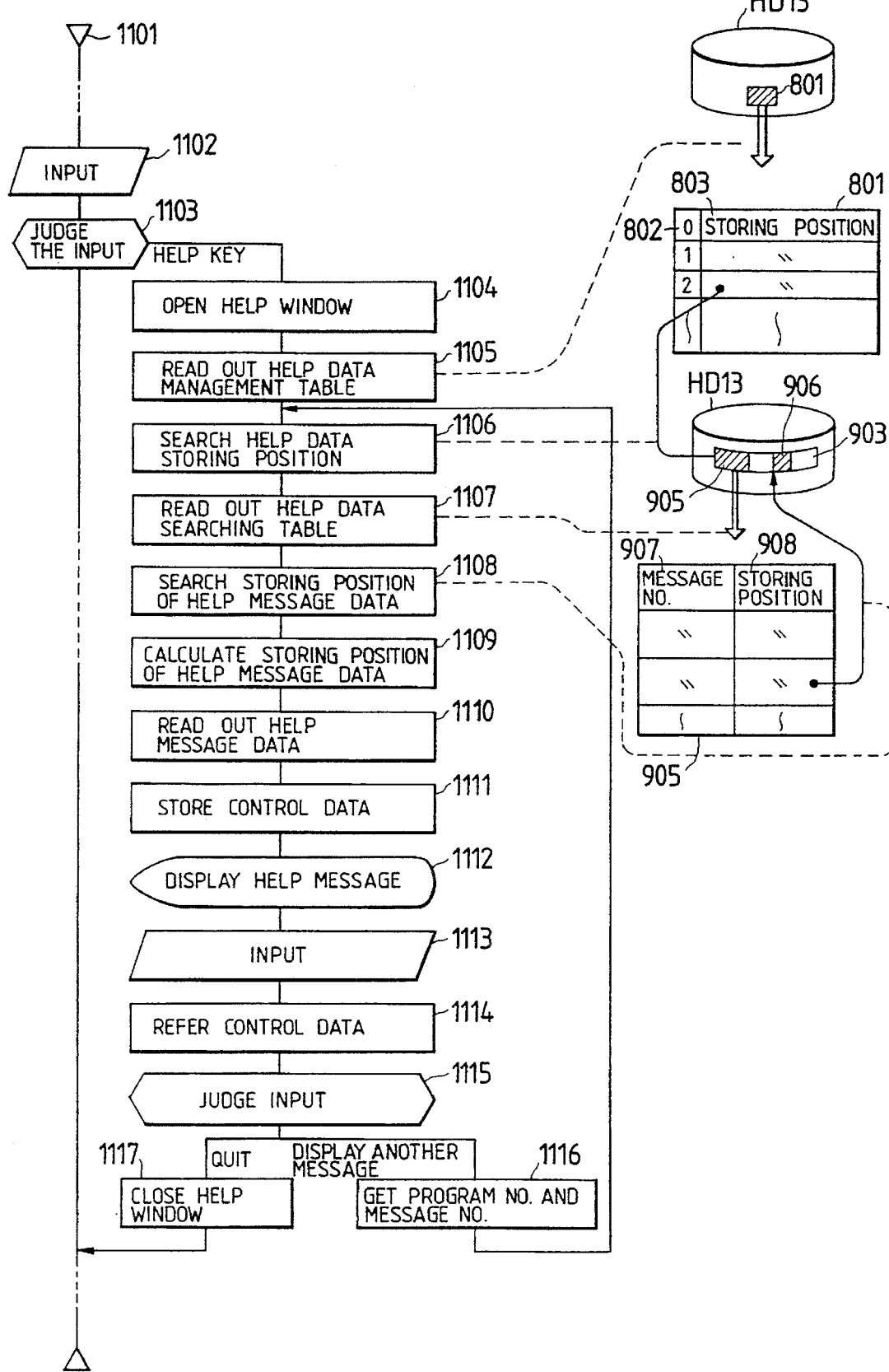
FIG. 11 is a view for explaining the process whereby a help message is searched for and displayed in the second embodiment of the present invention.

Referring now to FIGS. 10 and 11, how the help facility functions in the second embodiment is explained. FIG. 10 shows how a help data storing position is entered into the help data management table. FIG. 11 depicts how a help message is searched for and displayed.

In FIG. 10, an AP 901 is provided as stored on a floppy disk 1006. Using the FD 11 in FIG. 3, an initial loading program 1001 that corresponds to numeral 410 in FIG. 4 reads the AP 901 from the floppy disk 1006 and writes the program to a program storage area 1007, in step 1002. The initial loading program 1001 acquires, in step 1003, a help data storing position 904 that is described at the beginning of tie AP 901 to be loaded. The help data storing position 904 is described in offset relation to the beginning of the AP 901. A storing position for the AP 901 in the HD 13 is calculated, in step 1004, using the offset value 904 and the position in time HD 13 at which the AP 901 is actually stored. The calculated storing position is then entered, in step 1005, into the position corresponding to the program identifier 802 of the AP 901.

Referring to FIG. 11, how a help message is displayed is explained. When the help key is pushed, the keystroke is reported to the OS and to an AP 1101 that is currently running. The AP 1101 acknowledges his notice in step 1102, and judges, in step 1103, whether or not the help key input was actually carried out. After confirmation of the input, the AP 1101 activates the help program 408 in FIG. 4. When activated, the help program 408 opens, in step 1104, the help window 602 of FIG. 6 for displaying help data. Steps 1104 through 1117 show the progress of help program execution. The help program in the second embodiment differs from the help program of FIG. 2 in a third embodiment, to be explained later, only in steps 1105 through 1111.

The help data management table 801 is read in step 1105. Through the table, the storing position 803 for the help data part 903 in the HD 13 in acquired, in step 1106, in accordance with the program identifier 802 of the AP 1101. The help message searching table 905 is then read from the beginning of the help data part 903 in step 1107. The storing position 908 for the help message data 906 is acquired, in step 1108, according to a predetermined message identifier 907 of the AP 1101. The storing position 908 is described in offset relation to the beginning of the help data part 903. Thus the storing position for the help message data 906 in the HD 13 is calculated, in step 1109, based on the offset value 908 and the storing position 803 for the help data part 903 in the HD 13. Step 1110 for reading the help message data 906 and the subsequent steps will not be explained here because these steps are the same as steps 115 through 123 in a third embodiment, to be explained later.

As a summary of the second embodiment, every time APs 901 are loaded into a word-processor or the like, the storing position for the help data of each AP 901 in the HD 13 is entered into the help tiara management table 801. 10 The control data 703 of FIG. 7 is added to the help message data 906 to be displayed as help information. When the help message 605 is displayed, the interior of the rectangular area 603 defined by the control data part 703 is pointed to and specified. This allows other help message data to be referenced across different APs. That is, in the second embodiment of the present invention, every time integrated software comprising multiple APs is loaded into an information processing system such as a word-processor, the storing position for the help message of each AP is placed in the help data management table located in a memory area common to all the APs. This arrangement makes it possible for the user to reference other help messages across different APs.

In the second embodiment, the help data management table is located in the memory area common to APs. The table need not exist in the common memory area if the help program is provided as an independent program, AP 408, as explained in connection with the first embodiment.

A third embodiment of the present invention will now be described referring to the drawings. The third embodiment is characterized by the implementation of a help facility for displaying the help screen always in the foreground active window of a multi-window system. That is, the program identifier and message identifier of an AP that uses the help window are set beforehand to window management blocks of a list structure. These blocks manage the status information about each of the windows shown on the display window. The help facility for the third embodiment is explained using the help information searching table 501 in the first embodiment. With that explanation, it will be obvious that the help data management table 801 and help message searching table 905 in the second embodiment may also be used effectively in the third embodiment.

Figure 12:
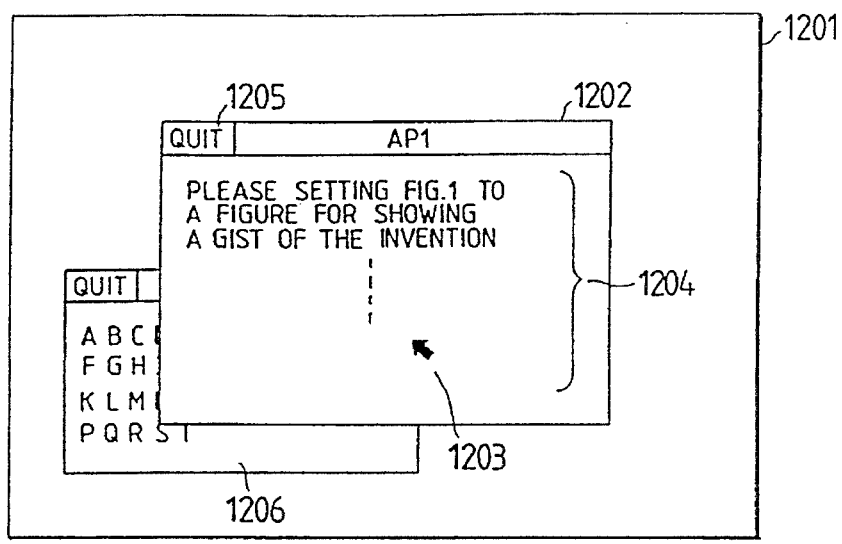
FIG. 12 is a view for explaining low multiple windows are displayed in a third embodiment of the present invention.

Referring to FIG. 12, there is explained a procedure for operating a multi-window system of the third embodiment through the use of a multi-window setup on a screen 1201. This embodiment envisages a window control system whereby windows correspond to APs on a one-for-one basis. Windows 1202 and 1206 are examples derived from such a system. In this window setup, only the foreground window 1202 is available for editing. Editing and window manipulating operations are carried out using the mouse 5 shown in FIG. 3. As the mouse 5 is moved on the desk top, a mouse cursor 1203 is moved accordingly on the screen. When the mouse cursor 1203 is positioned to a desired item, the mouse 5 is clicked to select the item. The window displays the data to be edited and the items to be selected with the mouse 5. These contents are collectively indicated by numeral 1204. When the user points to and selects a click-box for quitting 1205 using the mouse 5, the AP 1 that has kept the window open erases it and terminates the editing process. When the window 1206 in the background is selected using the mouse 5, the selected window appears as a window 1202 in the foreground. The AP that uses the window may then proceed with its editing process.

Figure 13A:
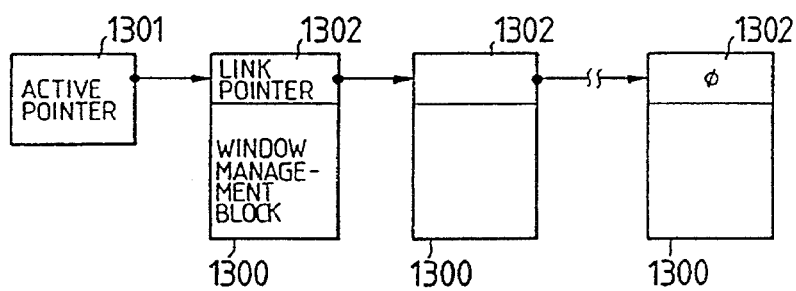
FIGS. 13A and B illustrate the construction of a window management block for a list structure in the third embodiment and the fourth embodiment of the present invention, respectively.
Figure 13B:
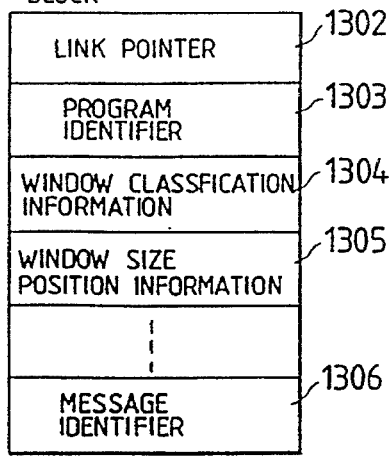

FIGS. 13A and B shows an example of typical window management blocks. These blocks retain the attributes, status and other associated information about each of multiple windows constituting a multi-window control setup like the one described above. The window management blocks 1300 for the windows involved are linked up via link pointers 1302 in the order in which an active pointer 1301 is followed successively by the subsequent windows. Each block includes fields for accommodating: a program identifier 1303 that identifies the program using the corresponding window; window type information 1304 that identifies the window type; window size position information 1305 that indicates the display position for the window on the screen; and a message identifier 1306 for the help data to be displayed. The value of the active pointer 1301 and that of the link pointer 1302 are reset to zero in a case where there is no window management block that would be indicated by numeral 1300. More about this case will be described later.

Figure 14:
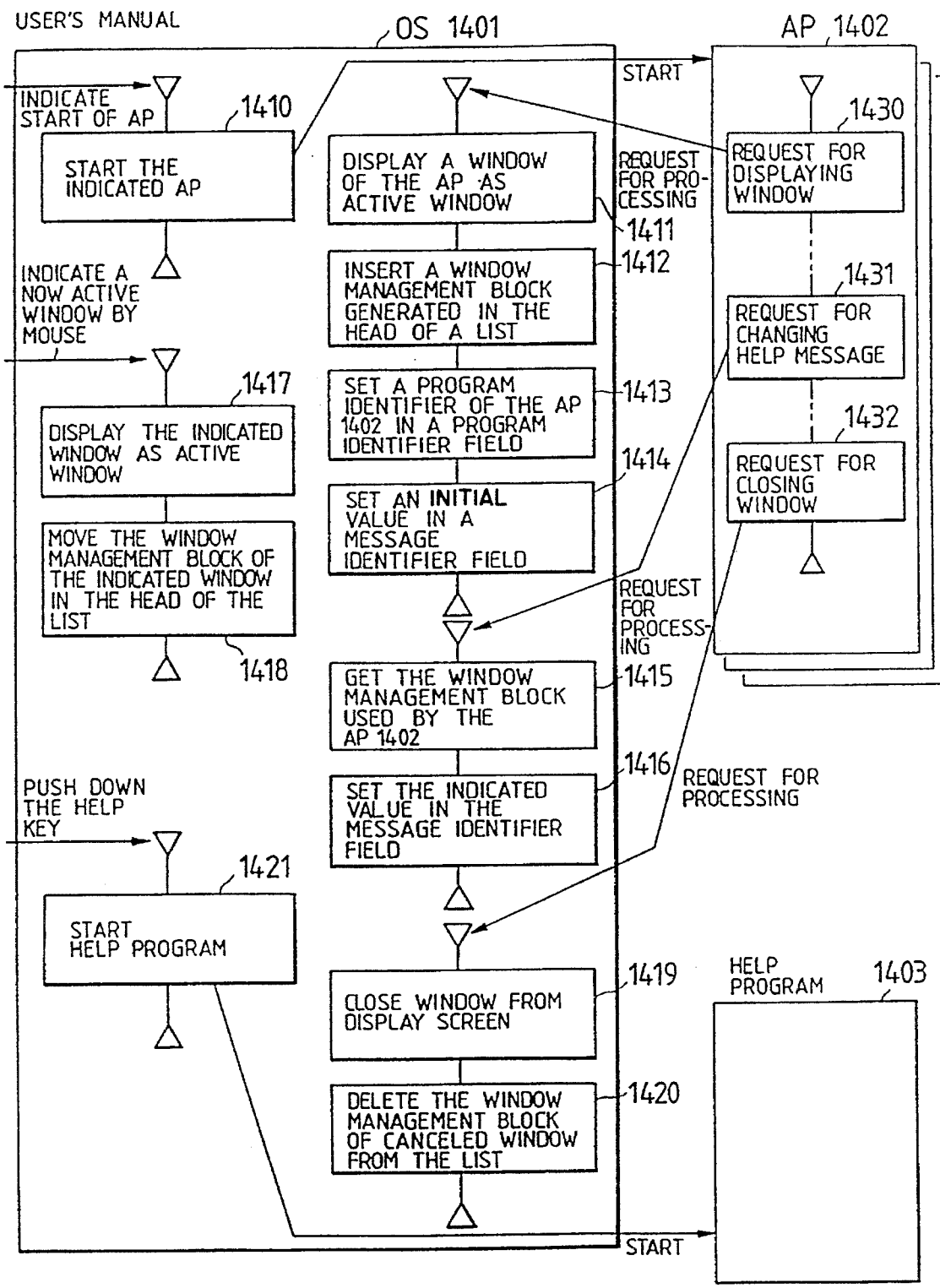
FIG. 14 is a view for explaining how a help program is activated in the third embodiment of the present invention.
Figure 15:
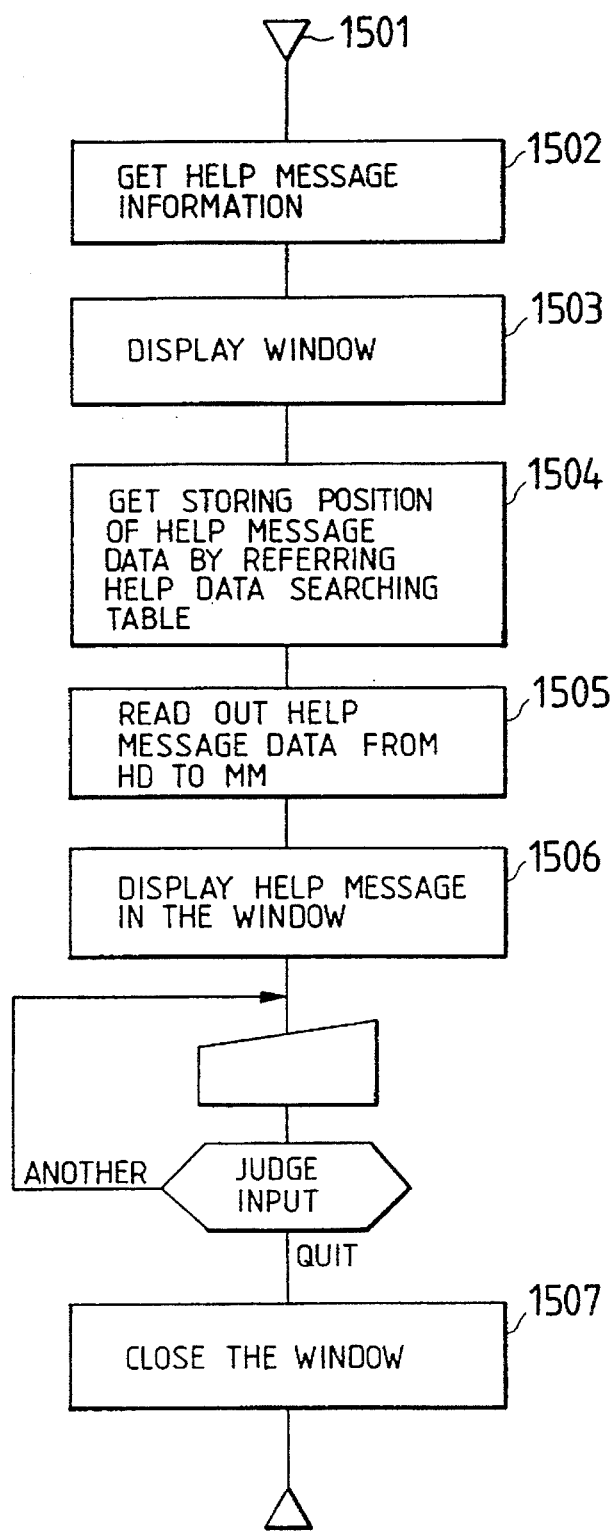
FIG. 15 is a flowchart indicating how the help program is run in the third embodiment of the present invention.

Referring now to FIGS. 14 and 15, there is explained how the help facility of the third embodiment is to be implemented in the above-described system configuration. FIG. 14 is a view that illustrates how an operating system of this embodiment provides help control. FIG. 15 is a flowchart that shows how a help program of this embodiment runs in order to display help messages.

In FIG. 14, the process leading up to activation of a help program 1403 is explained. A user-initiated operation causes an OS 1401 to activate a, AP 1402 in step 1410. After activation, the AP 1402 requests that the OS 1401 open a window in step 1430. In response, the OS 1401 displays an active window in the foreground of the CRT in step 1411. At the same time, the OS 1401 generates the window management block 1300, and sets the value of the active pointer 1301 to the link pointer 1302 of the block 1300 generated. Thereafter, the value of the active pointer 1301 is changed so as to indicate the window management block 1300. The block is then inserted to the beginning of the list, in step 1412.

The program identifier of the AP 1402 that requested the opening of the window is set, in step 1413, to the program identifier field 1307 of the window management block 1300. The message identifier 1306 is set to zero for a default in step 1414.

Depending on its executing status, the AP 1402 issues a help message change request, in step 1431, to the OS 1401. In response, the OS 1401 searches, in step 1415, for the window management block 1300 having the same program identifier as that of the AP that made the request. During the search, the OS 1401 goes through the list beginning at the active pointer 1301. When the block is found, the OS 1401 sets to the message identifier 1306 the number specified by the AP 1402, in step 1416.

When a window in the background is selected by the mouse 5, the OS 1401 displays that window in the foreground in step 1417. At the same time, the corresponding window management block is linked to the beginning of the list in step 1418.

When the AP that has kept the window displayed requests, in step 1432, that the OS 1401 erase the window, the OS 1401 erases that window from the CRT 7, in step 1419. Then the OS 1401 deletes the corresponding window management block from the list in step 1420. When the help key is pushed, the OS 1401 interrupts the ongoing AP 1402 and activates the help program 1403 in step 1421. The help program 1403 displays a help message that corresponds to the active window in the foreground.

Referring to FIG. 15, the flow 1501 of the help program 1403 in execration is explained in detail. Upon activation, the help program 1403 requests, in step 1502, that the OS 1401 allow the program to get help message information for the active window. In response, the OS 1401 reads the program identifier 1303 and message identifier 1306 from the window management block 1300 indicated by the active pointer 1301. When read out, these identifiers are brought to the help program 1403.

The OS 1401 opens the window ox which to display a help message, in step 1503. After this, the OS 1401 references the help information searching table 501 in FIG. 5 in accordance with the program identifier 1303 and message identifier 1306 in order to find, in step 1504, the storing position 504 for the corresponding help message data in the HD 13. The help message data is read from the HD 13 and written to the MM3 in step 1505. Finally, the help message is displayed, in step 1506, inside the window based on the data having been read out. The OS 1401 then waits for the user to make an input operation. If the click-box for quitting is selected on the window using the mouse 5, the help program 1403 requests, in step 1507, that the OS 1401 close the window to terminate the process. In response, the OS 1401 deletes the window, terminates the help program 1403, and resumes the execution of the AP 1402.

As a variation of the third embodiment described above, the following contrivances may also be provided to determine the help message to be displayed.

In FIG. 16, there is provided a status management table 1603 that stores a program identifier 1604 and a message identifier 1605 for each window 1202 in FIG. 12. A current pointer 1602 is provided to point to the field corresponding to the window 1202 shown in the foreground. Window management blocks 1600 are linked successively via the active pointers 1301 and link pointers 1302 in FIGS. 13A and B. These blocks are provided each with a status management table pointer 1601 pointing to that field in the status management table 1603 that corresponds to each window 1202. When a window 1202 is displayed, the value of the program identifier of any AP among 401 through 408 which displayed the window is set to the program identifier 1604 in the status management table 1603. The setting of the identifier is performed by way of the status management table pointer 1601 in the window management block 1600 involved.

Each of the APs 401 through 408 sets the message identifier reflecting its execution status to the field of the message identifier pointed to by the current pointer 1602. When the help facility is requested, the help program gets the program identifier 1604 and message identifier 1605 from that field in the status management table 1603 which is pointed to by the current pointer 1602. The help program then searches for and displays the corresponding message data 906. In this variation, the status management table 1603 is provided in the MM 2 in a save area common to the APs 401 through 408.

In the embodiments described above, the program and message numbers are treated as identical to the program and message identifiers stored in the status management table. In practice, a program identifier may be an address on a fixed disk at which the APs 401–408 are stored, an address of a table that manages these programs, or anything that uniquely identifies each AP. Likewise, a message identifier may be an address on a fixed disk at which the corresponding message is stored, or anything that uniquely identifies each message.

According to the present invention as described above, integrated software comprising multiple application programs allows these programs to store their executing status in a memory area common to all of them. When activated by operation of the help key, the help program displays the help data reflecting the executing status. The help facility thus implemented allows each application program to store its executing status at any point in time. This makes it possible, whenever the help facility is requested, to obtain help information that reflects more detailed status of a desired application program.

The workings of the help facility for each application program are simplified according to the present invention. This means a simplified help facility that translates into a minimum increase in the total size of the integrated software equipped with such facility. Furthermore, where control data is added to help data and the user carries out the instructions defined by such control data, other help data may be referenced across different application programs.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A method of controlling help-information of an information handling system having a central processing unit (CPU) for executing programs and memory means, input means, and display means connected to the CPU, comprising the steps of:

renewing successively status pointers each of which points to an executing status stored in a status management table in response to execution of a corresponding application program;

referring to said status management table in response to a help request provided from an operator during execution of an application program to obtain an executing status pointed to by a status pointer corresponding to said application program; and searching help data corresponding to said executing statuses using said obtained executing status of said status management table to display help-information corresponding to said obtained executing status of said application program on the display means;

wherein said status management table stores said executing statuses each of which includes a message identifier corresponding to an executing status of one of said application programs to be executed in the CPU;

wherein said status pointer stores pointers each pointing to an executing status stored in said status management table corresponding to an executing status of an application program to be executed in the CPU.

2. A method according to claim 1, wherein said status management table is stored in a memory area of the memory means, said memory area being commonly accessed by each of said application programs.

3. A method according to claim 1, wherein a help-data management table and a help message searching table both formed in the memory means are searched in said searching step, said help-data management table stores a storing position of help-data corresponding to each application program, said help message searching table stores a message identifier related to an executing status corresponding to each of said application programs and a storing position of help message data corresponding to said message identifier of said each application program, said help-data includes a help-message searching table and a plurality of help message data.

4. A method according to claim 1, wherein a help-information searching table is searched in said searching step, said help-information searching table includes a message identifier and a storing position of help message data related to said message identifier corresponding to each application program.

5. A method according to claim 1, further comprising the steps of:

assigning a respective window of multi-windows which are to be displayed on the display means to a respective one of said application programs;

simultaneously displaying on the display means said multi-windows for respective ones of the application programs;

selecting one of said multi-windows as an active window by current pointing means.

6. A method according to claim 1, wherein said help data includes display data to be displayed on the display means and control data each having a message identifier corresponding to each of said application programs.

7. The method according to claim 6, further comprising the steps of:

judging whether an input, supplied from the input means after displaying said help-information on the display means, is another help request in accordance with said control data; and searching for another help-data when said input is another help request in accordance with said control data.

8. A system for controlling help-information in an information handling apparatus having a central processing unit (CPU) for executing programs and memory means, input means, and display means connected to the CPU, said system comprising:

a set of programs to be executed in the CPU including a plurality of application programs and an operating system program;

a status management table formed in the memory means, said status management table stores a list of executing statuses each of which includes a message identifier corresponding to an executing status of one of said application programs to be executed in the CPU;

means for successively renewing each of a plurality of status pointers for continuously pointing to an executing status stored in said status management table corresponding to an executing status of an application program to be executed in the CPU, in response to execution of a corresponding application program;

means for referring to an executing status of said status management table pointed to by said status pointer in response to a help request supplied from the input means during execution of one of said application programs to obtain an executing status corresponding to said one application program;

means for searching help message data corresponding to said executing statuses of said status management table using said obtained executing status;

means for supplying help message data corresponding to said obtained executing status to the display means.

9. A method according to claim 8, wherein said status management table is stored in a memory area of the memory means, said memory area being commonly accessed by each of said application programs.

10. A system according to claim 8, further comprising:

a help-information searching table formed in the memory means, said help-information searching table stores a plurality of sets each having a message identifier, and a storing position of help message data related to said message identifier and corresponding to each of said application programs.

11. A system according to claim 8, further comprising:

a help-data management table formed in the memory means, said help-data management table stores a storing position of help data corresponding to each of said application programs; and a help message searching table formed in the memory means, said help message searching table stores a plurality of sets each having a message identifier and a storing position of help message data corresponding to said message identifier.

12. A system according to claim 8, further comprising:

means for allocating a respective window of multi-windows and a window control block to a respective one of said application programs to enable simultaneous display of said multi-windows on the display means;

wherein each of said window control blocks has a status management table pointer, said status management table pointer points to one of said message identifiers corresponding to one of said application programs.

13. A system according to claim 12, further comprising:

active pointing means for pointing to a window control block corresponding to an active window of said multi-windows.

14. A control apparatus for controlling help facility in an information handling system having a central processing unit (CPU) for executing programs and memory means, input means, and display means connected to the CPU, said apparatus comprising:

a plurality of application programs to be executed in the CPU and interrupted in response to a help request provided from the input means;

an operating system program to be executed in the CPU for controlling the system and managing help message data corresponding to an executing status of each of said application programs, said operating system program being informed of said executing status by a corresponding application program;

a status pointer, which is formed in the memory means and successively renewed in response to execution of each application program, for continuously pointing to an executing status stored in said status management table corresponding to an executing status of each application program to be executed in the CPU, in response to execution of said application program; and a help program to be started in response to said help request and executed in the CPU for referring to an executing status of an application program pointed to by said status pointer interrupted in response to said help request so as to search and deliver help message data corresponding to said executing status of said interrupted application program to the display means.

15. A control apparatus according to claim 14, further comprising:

a help information searching table formed in the memory means, said help information searching table stores said message identifier, and a storing position in the memory means of said help message data corresponding to each of said application programs;

wherein said help program searches said help message data in accordance with said help information searching table.

16. A control apparatus according to claim 14, further comprising:

a help data area formed on the memory means for storing said help message data corresponding to each of said executing statuses including display data to be displayed on the display means and control data which have display positions of said display data, corresponding to program numbers and corresponding message numbers.

* * * * *